United States Patent [19]
Yasui

[11] Patent Number: 5,313,389
[45] Date of Patent: May 17, 1994

[54] FAIL-SAFE MECHANISM FOR VEHICLE STABILITY AUGMENTATION STEERING SYSTEM

[75] Inventor: Yoshiyuki Yasui, Kariya City, Japan
[73] Assignee: Aisin Seiki Kabushiki Kaisha, Kariya City, Japan
[21] Appl. No.: 551,127
[22] Filed: Jul. 11, 1990

Related U.S. Application Data

[63] Continuation-in-part of Ser. No. 475,899, Feb. 6, 1990, Pat. No. 5,159,553, which is a continuation-in-part of Ser. No. 243,822, Sep. 13, 1988, Pat. No. 4,941,097.
[51] Int. Cl.$^5$ ............................................. B62D 5/22
[52] U.S. Cl. ........................... 364/424.05; 180/79.1; 180/142; 180/148; 280/90
[58] Field of Search .................. 364/424.05; 180/132, 180/141, 143, 148, 158, 162, 142, 79.1, 79.3, 140; 289/89, 90

[56] References Cited

U.S. PATENT DOCUMENTS

| | | | |
|---|---|---|---|
| 3,456,752 | 7/1969 | Fonda | 180/141 X |
| 3,716,110 | 2/1973 | Fonda | 180/142 |
| 3,866,706 | 2/1975 | Lincke et al. | 180/79.3 |
| 4,049,961 | 9/1977 | Marcy | 250/202 |
| 4,144,948 | 3/1979 | Sergay | 180/148 |
| 4,418,780 | 12/1983 | Ito et al. | 180/140 |
| 4,440,254 | 4/1984 | Shibahata et al. | 180/140 |
| 4,441,572 | 4/1984 | Ito et al. | 180/140 |
| 4,534,577 | 8/1985 | Howard | 180/132 X |
| 4,540,059 | 9/1985 | Shibahata et al. | 180/141 |
| 4,546,839 | 10/1985 | Moguchi | 180/142 |
| 4,549,468 | 10/1985 | Trintignac et al. | 180/132 X |
| 4,634,135 | 1/1987 | Nakata et al. | 180/143 X |
| 4,666,013 | 5/1987 | Shibahata et al. | 180/141 |
| 4,705,131 | 11/1987 | Shibahata et al. | 180/140 |
| 4,705,132 | 11/1987 | Tsuchiya | 180/148 |
| 4,706,771 | 11/1987 | Kawabe et al. | 180/142 |
| 4,708,220 | 11/1987 | Moto et al. | 180/142 |
| 4,717,175 | 1/1988 | Arai et al. | 180/141 X |
| 4,718,685 | 1/1988 | Kawabe et al. | 180/140 X |
| 4,758,053 | 7/1988 | Yasuno | 303/91 |
| 4,759,419 | 7/1988 | Nagae et al. | 180/142 |
| 4,768,602 | 9/1988 | Inoue et al. | 364/424.05 X |
| 4,771,846 | 9/1988 | Venable et al. | 180/142 |
| 4,773,012 | 9/1988 | Ito et al. | 364/424.05 X |
| 4,793,431 | 12/1988 | Eto et al. | 364/424.05 X |
| 4,823,898 | 4/1989 | Ogura et al. | 180/140 |
| 4,828,063 | 5/1989 | Ogura et al. | 180/140 |
| 4,830,131 | 5/1989 | Miyoshi et al. | 180/141 |
| 4,858,713 | 8/1989 | Kawakami et al. | 180/143 |
| 4,878,557 | 11/1989 | Shibahata et al. | 180/140 |
| 4,941,097 | 7/1990 | Karnopp et al. | 364/424.05 |
| 4,967,865 | 11/1990 | Shindler | 180/79.1 |
| 4,970,646 | 11/1990 | Sugasawa et al. | 364/424.05 |
| 5,048,627 | 9/1991 | Eguchi et al. | 180/140 |
| 5,156,229 | 10/1992 | Yasui et al. | 180/140 |
| 5,159,553 | 10/1992 | Karnopp et al. | 364/124.05 |

FOREIGN PATENT DOCUMENTS

| | | |
|---|---|---|
| 0054776 | 2/1981 | European Pat. Off. . |
| 0089631 | 3/1983 | European Pat. Off. . |
| 0150303 | 11/1984 | European Pat. Off. . |
| 0350020 | 1/1990 | European Pat. Off. . |
| 0352759 | 1/1990 | European Pat. Off. . |
| 3729898 | 3/1989 | Fed. Rep. of Germany . |
| 3811312 | 10/1989 | Fed. Rep. of Germany . |
| 2636288 | 3/1990 | France . |
| 2203295 | 3/1988 | United Kingdom . |

OTHER PUBLICATIONS

European Search Report.
Adaptive Steering, Bendix Technical Journal, Autumn 1969.

Primary Examiner—Thomas G. Black
Assistant Examiner—Collin W. Park
Attorney, Agent, or Firm—Banner, Birch, McKie & Beckett

[57] ABSTRACT

The steering stability of a moving vehicle is maintained by measuring an actual yaw rate of the vehicle and determining a desired yaw rate of the vehicle and producing an output signal in response to a comparison of the actual and desired yaw rates. The steering angle of steerable wheels of the vehicle is controlled in response to the output signal in a manner tending to substantially conform the actual yaw rate to the desired yaw rate, thereby maintaining vehicle stability. The steerable wheels are steered by a steering wheel, and are independently steered by a motor in response to the output signal. The motor comprises a fluid motor. Additionally, valves are provided to stop the flow of fluid in the event that a malfunction occurs.

27 Claims, 14 Drawing Sheets

5,313,389

1

FAIL-SAFE MECHANISM FOR VEHICLE STABILITY AUGMENTATION STEERING SYSTEM

RELATED INVENTIONS

This is a Continuation-In-Part of U.S. application Ser. No. 07/475,899 filed Feb. 6, 1990, now U.S. Pat. No. 5,159,553 which is a continuation-in-part of U.S. patent application Ser. No. 07/243,822, filed Sep. 13, 1988, now U.S. Pat. No. 4,941,097 the disclosures of which are herein incorporated by reference in their entirety.

BACKGROUND OF THE INVENTION

The present invention generally relates to an apparatus for steering a vehicle.

During vehicle motion, such as cornering, for example, vehicle handling dynamics are affected by various parameters such as road conditions, tire characteristics, weight distribution, braking, accelerating, and the like, which can lead to oversteer or understeer conditions. In an effort to deal with this problem and attempt to maintain vehicle handling dynamics constant, there have been heretofore proposed complex suspension link systems, drive train arrangements, and braking systems. However, such proposed systems involve relatively numerous parts which undesirably increase the complexity and size of the system.

SUMMARY OF THE INVENTION

The present invention is directed to a vehicle steering apparatus for providing adaptive steering control and including a fail-safe mechanism. The apparatus includes a steering rod mounted for lateral movement with respect to the vehicle, with the steering rod linked at both ends to the steerable wheels of the vehicle. A steering mechanism provides steering to the vehicle by causing lateral movement of the steering rod relative to the vehicle. An adaptive steering control mechanism causes the steering rod to undergo lateral movement relative to the vehicle in addition to the lateral movement provided by the steering mechanism. The adaptive steering mechanism includes a fluid pressure responsive device which provides the further lateral movement to the steering rod, a fluid pressure source which provides fluid pressure to the fluid pressure responsive device, and a fail-safe valve to control the flow of fluid between the fluid pressure source and the fluid pressure responsive device. The fail-safe valve includes at least one control valve which is normally closed to isolate the fluid pressure response device from the fluid pressure source device.

In a further embodiment, the fluid pressure responsive device includes a housing and a piston disposed within the housing and separating the interior of the housing into first and second fluid chambers. The piston is disposed on the steering rod.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION

Figure 1:
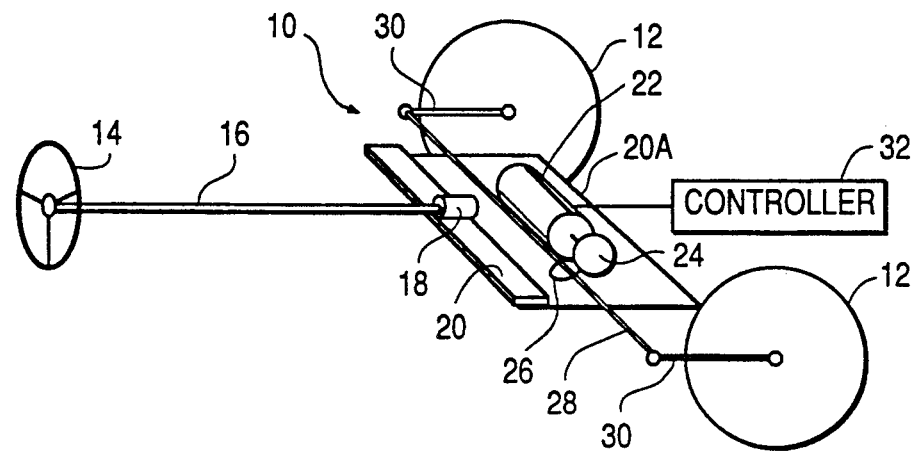
FIG. 1 is a schematic perspective view of a first embodiment of a steering mechanism for the steerable wheels of a vehicle, in accordance with the present invention.
Figure 2:
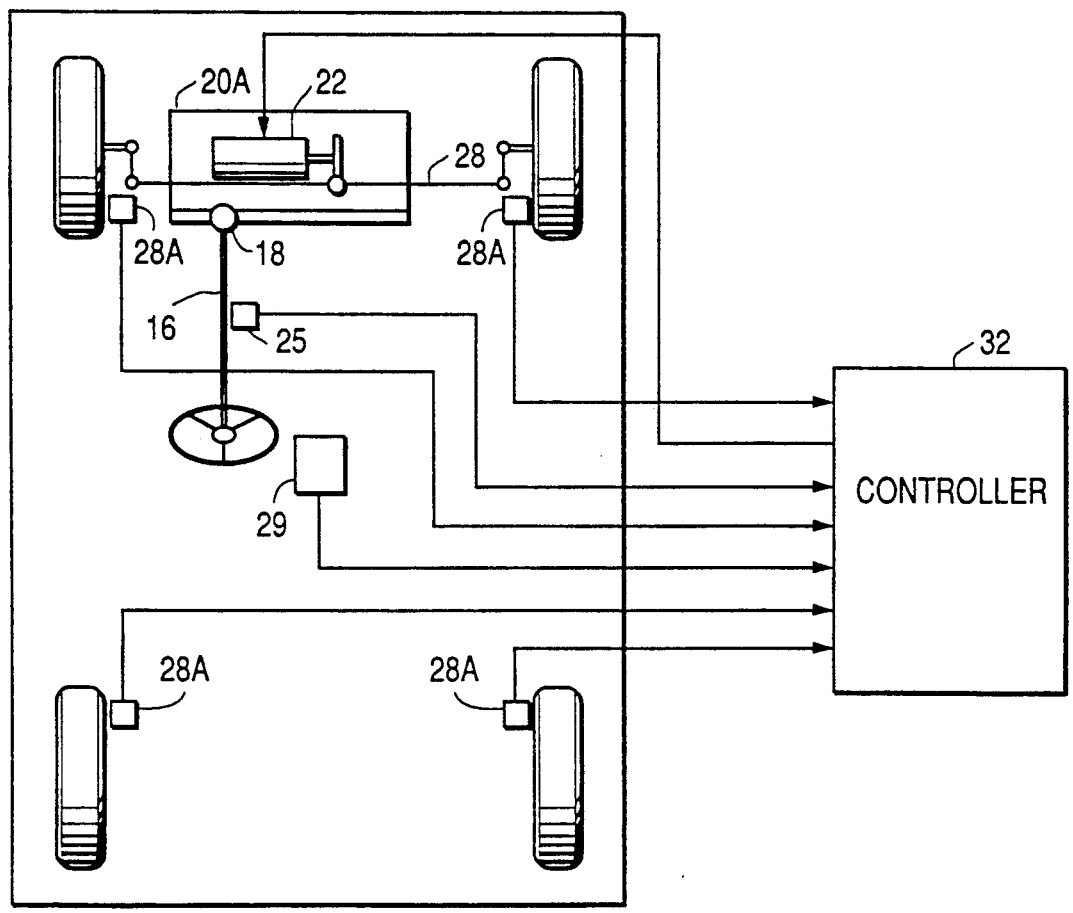
FIG. 2 is a schematic diagram of a first embodiment of a system for controlling the steering mechanism, according to the present invention.

Depicted in FIG. 1 is a steering system 10 for a vehicle which includes a pair of steerable wheels 12 operably connected to a steering wheel 14 by means of a steering mechanism. The steering mechanism is of the rack and pinion type wherein the steering shaft 16 carries a pinion 18 which meshes with teeth on a reciprocable rack 20. Fixed on an extension 20A of the rack is an electric motor housing 22. The motor includes an output shaft which drives an output gear 24. The output gear meshes with a helical thread of a nut 26 which is fixed to a tie rod 28. The ends of the tie rod 28 are connected to a pair of steering arms 30 which transmit steering motion to the steerable wheels 12.

Thus, in practice, the shaft 16 and pinion produce linear movement of the rack 20 and rack extension 20A, and such linear movement is transmitted to the motor housing and output gear 24. The latter produces a linear movement of the nut 26 due to the meshed coupling between the output gear 24 and the nut 26. Linear movement of the nut 26 is transmitted directly to the tie rod 28. In this fashion, the orientation of the wheels 12 can be varied by turning the steering wheel.

In order to prevent excessive oversteer or understeer, the present invention enables the wheel orientation to be adjusted independently of the position of the steering wheel by actuation of the motor 22 to produce rotation of the output gear 24 and a resulting linear movement of the nut 26 and tie rod 28. Thus, augmented or adaptive steering control may be provided in order to ensure that the vehicle travels on the desired path.

Actuation of the motor 22 is produced by electrical signals from a controller 32 which utilizes signals dependent upon steering angle and vehicle speed to determine a desired yaw rate, and compares that desired yaw rate to an actual yaw rate to control the tire angle. Yaw rate can be defined as the rate of rotation of the vehicle about a vertical axis.

Figure 3:
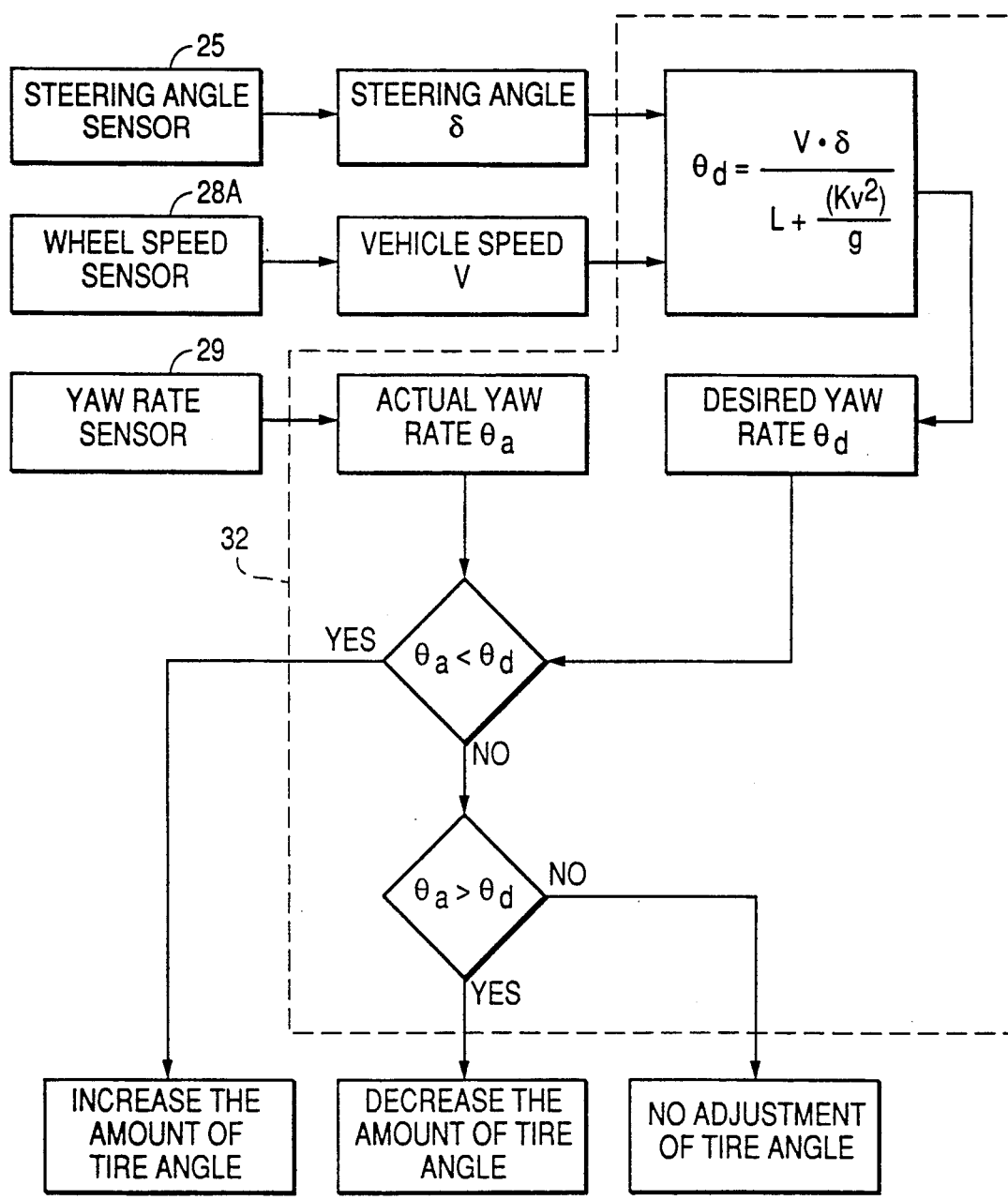
FIG. 3 is a flowchart for the system shown in FIG. 2.

Referring to FIG. 3, steering angle signal 6 is provided by a conventional steering wheel angle sensor 25 which is operably connected to the steering shaft 16 of the vehicle. The vehicle speed signal V is provided by conventional wheel speed sensors 28A operably connected to all ground wheels of the vehicle. If the wheel speeds are different, the controller will obtain an average thereof. An actual yaw rate is measured by a conventional yaw rate sensor such as a gyro 29.

A desired yaw rate ($\theta_d$) is calculated by the controller in accordance with the relationship:

$$\theta_d = \frac{V \cdot \delta}{L + \frac{(KV^2)}{g}}$$

where $\theta_d$ is the desired yaw rate, L is the length of the wheel base of the vehicle (i.e., the distance between the front and rear axles), g is acceleration due to gravity, $\delta$ is the steering angle, V is vehicle speed, and K is a constant greater than 0 and no greater than 1 degree in order to achieve a neutral or slight understeer condition.

After determining the desired yaw rate $\theta_d$ in the above manner, the controller compares the desired yaw rate value with the actual yaw rate $\theta_a$. When $\theta_a = \theta_d$ no steering adjustment is necessary; when $\theta_a < \theta_d$, an understeer condition exists, requiring that the amount of tire angle be increased; and when $\theta_a > \theta_d$, an oversteer condition exists requiring that the amount of tire angle be decreased. The direction in which the output gear 24 is rotated is dependent upon which of the values $\theta_a$ and $\theta_d$ is larger, and the amount of rotation of the output gear 24 is dependent upon the magnitude of the difference between the values $\theta_a$ and $\theta_d$. Rotation of the output gear 24 continues until the controller observes that $\Theta_a = \theta_d$. Thus, adaptive steering control is provided to correct understeer or oversteer.

Figure 4:
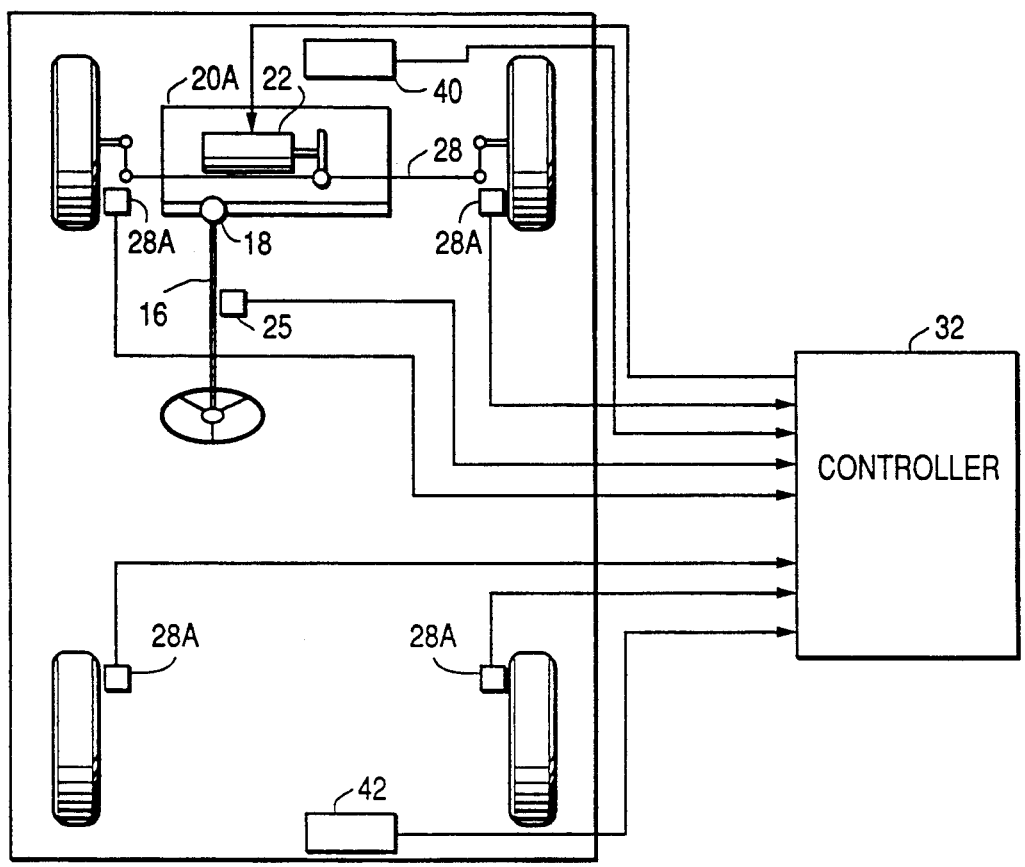
FIG. 4 is a schematic diagram of a second embodiment of a system for controlling the steering mechanism, in accordance with the present invention.
Figure 5:
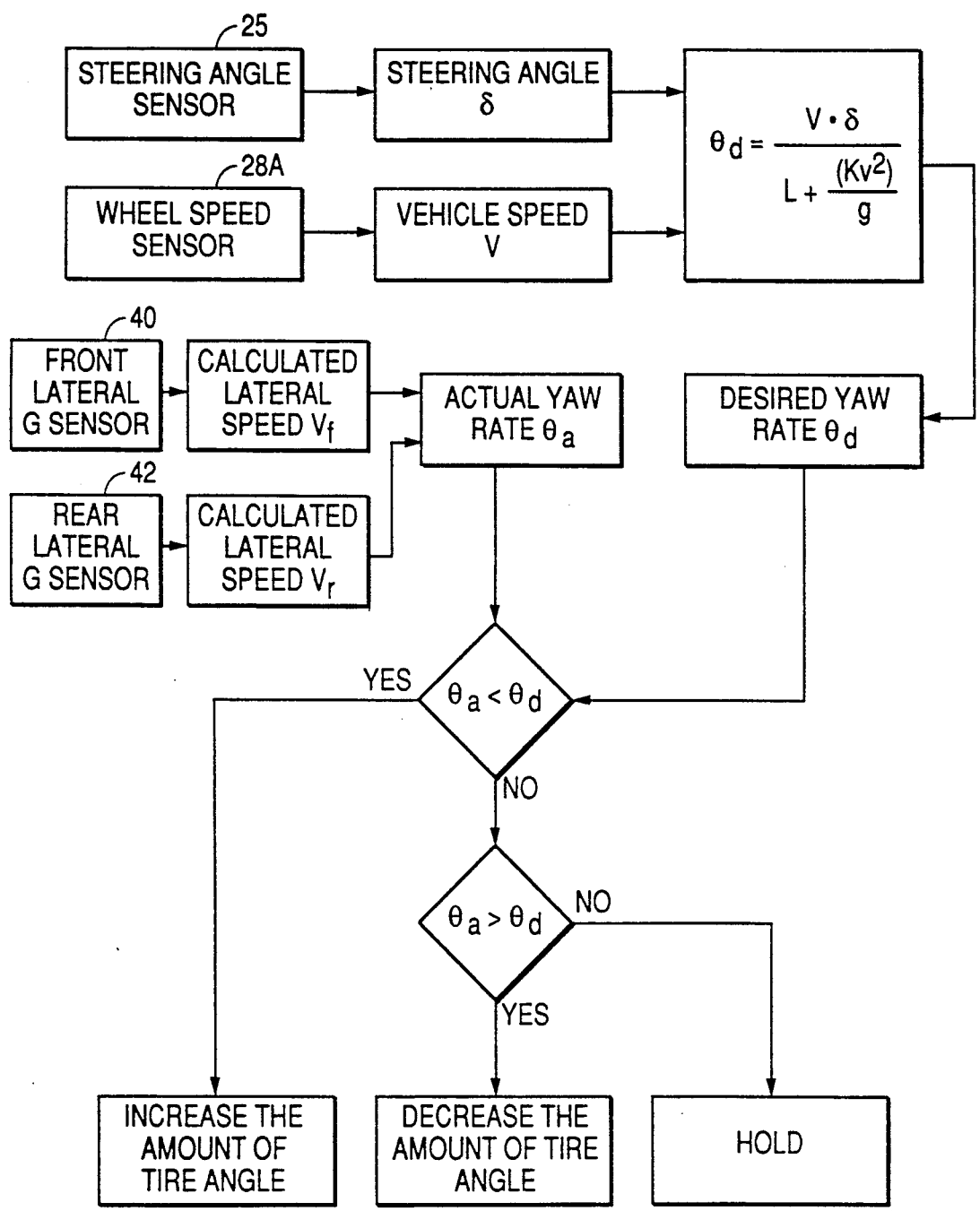
FIG. 5 is a flow chart for the system shown in FIG. 4.

In FIGS. 4 and 5, another preferred embodiment of the control aspect of the present invention is depicted wherein an alternative way of determining actual yaw rate is employed. That is, in lieu of a yaw rate sensor there are employed conventional front and rear lateral acceleration (G-force) sensors 40, 42. The measured front and rear lateral accelerations are converted to front and rear lateral velocity values $V_f$, $V_r$, respectively, by the controller, enabling the actual yaw rate $\theta_a$ to be determined by the following relationship:

$$\theta_a = \frac{V_f - V_r}{N}$$

where N is the distance between the front and rear sensors 40, 42.

Figure 6:
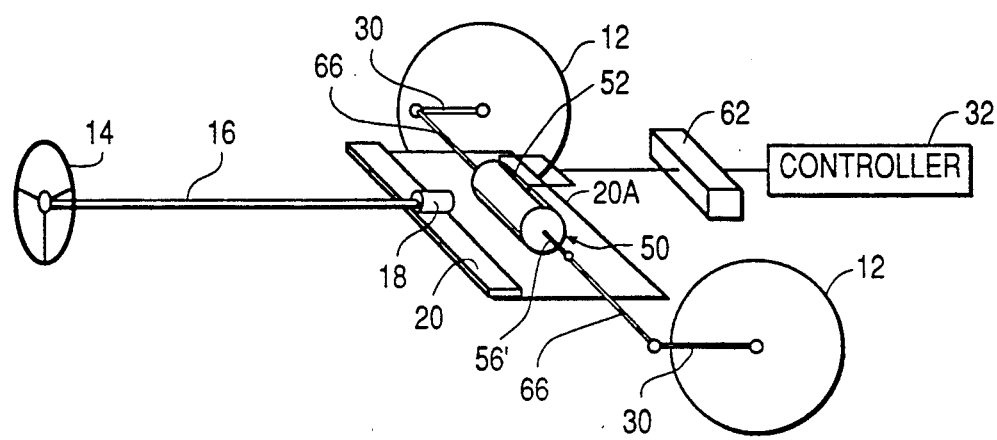
FIG. 6 is a schematic perspective view of a second embodiment of a steering mechanism for steering the steerable wheels.
Figure 7:
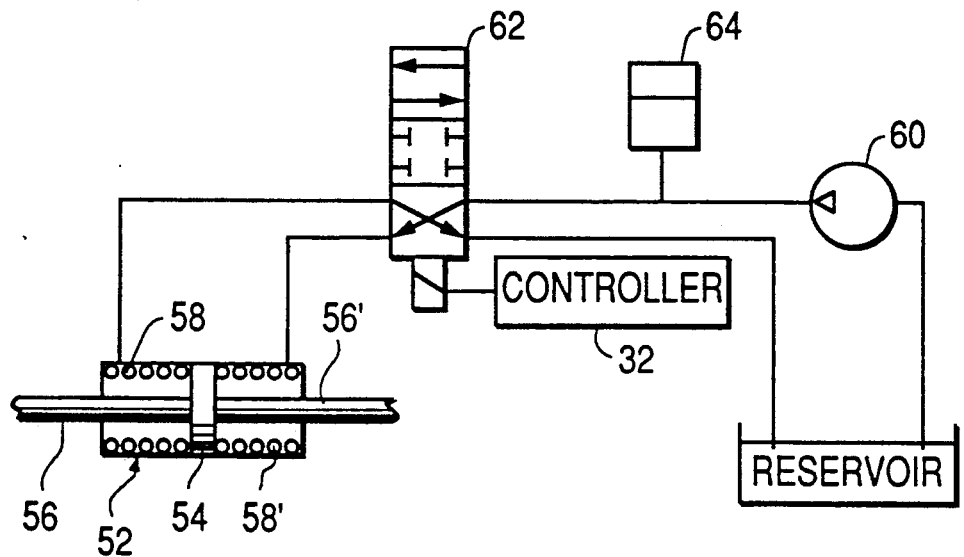
FIG. 7 is a schematic representation of a portion of the steering mechanism of FIG. 6.

In FIGS. 6 and 7, a second preferred embodiment of a steering mechanism aspect of the invention is depicted wherein the electric motor has been replaced by a pressurized fluid motor 50. The fluid motor comprises a fluid cylinder 52 in which is disposed a reciprocable piston 54. A pair of piston rods 56, 56' are connected to opposite sides of the piston 54 and project from opposite ends of the cylinder. Alternatively, a single steering rod having a piston integrally formed thereon could be used in place of the pair of piston rods and piston, as shown with reference to FIG. 8. A pair of springs 58, 58' disposed within the cylinder bias the piston 54 to a central location within the cylinder 52. A fluid pump 60, operated by the engine, supplies pressurized fluid, for example, oil, to a three-way solenoid valve 62, the position of which is determined by a signal from the controller 32. An accumulator 64 can be provided in the fluid line between the pump 60 and the valve 72 to dampen oscillations in fluid pressure.

In operation, steering of the wheels 12 is effected by the steering wheel 14 and the rack and pinion coupling 18, 20. Linear movement of the rack 20 is transmitted to the cylinder 52 which is fixedly mounted on the rack extension 20A. Linear movement of the cylinder is transmitted to the tie rods 66 which are connected to outer ends of the piston rods 56, 561. In the event that the controller 32 detects an understeer or oversteer condition, the electrically actuable solenoid valve 62 is actuated by an electric output signal from the controller 32 to displace the piston in either of two directions to turn the wheels 12 independently of the position of the steering wheel, thereby making the needed correction in tire angle.

Figure 8:
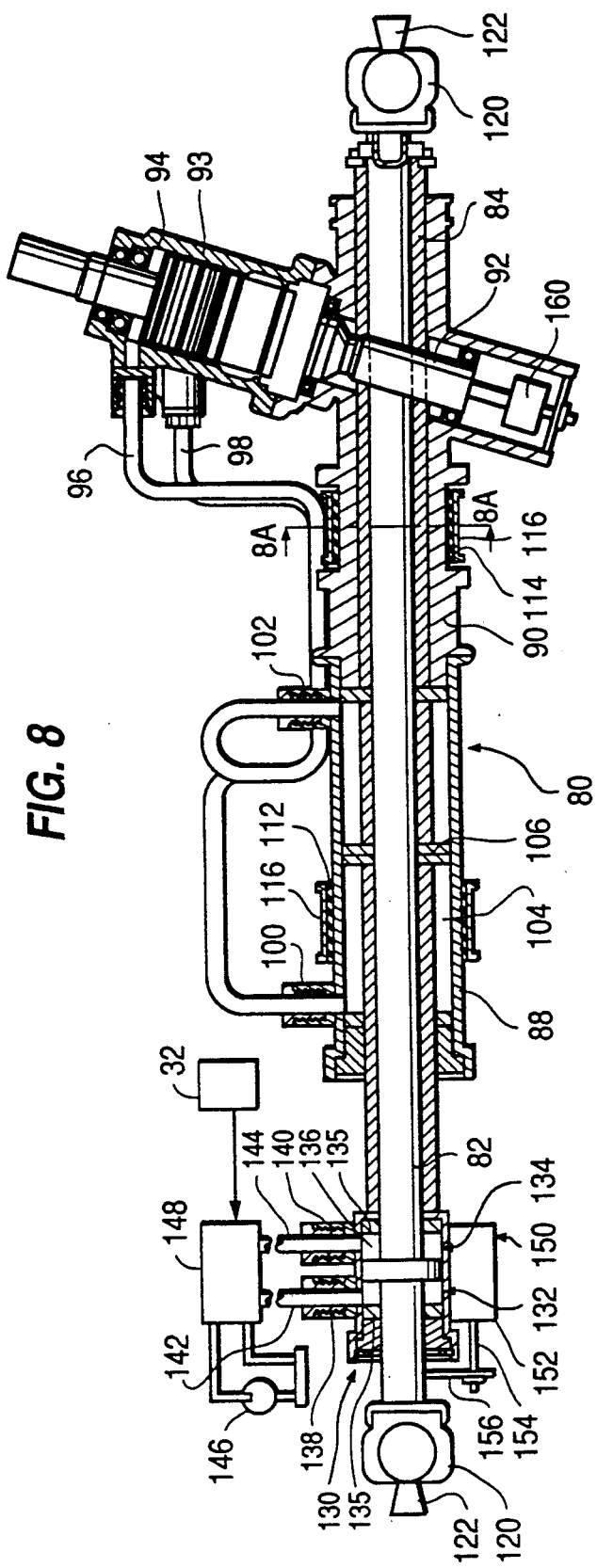
FIG. 8 is a longitudinal sectional view through a mechanism operating in accordance with the embodiment disclosed in connection with FIG. 6.
Figure 8B:
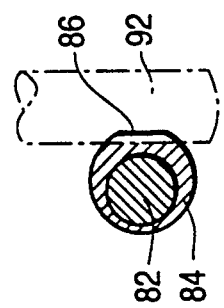
FIG. 8B is a cross-sectional view depicting the manner in which a steering pinion engages a rack.
Figure 8A:
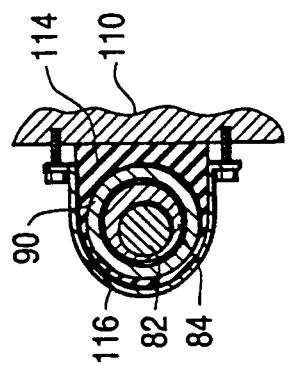
FIG. 8A is a cross-sectional view taken along the line 8A—8A in FIG. 8.
Figure 9:
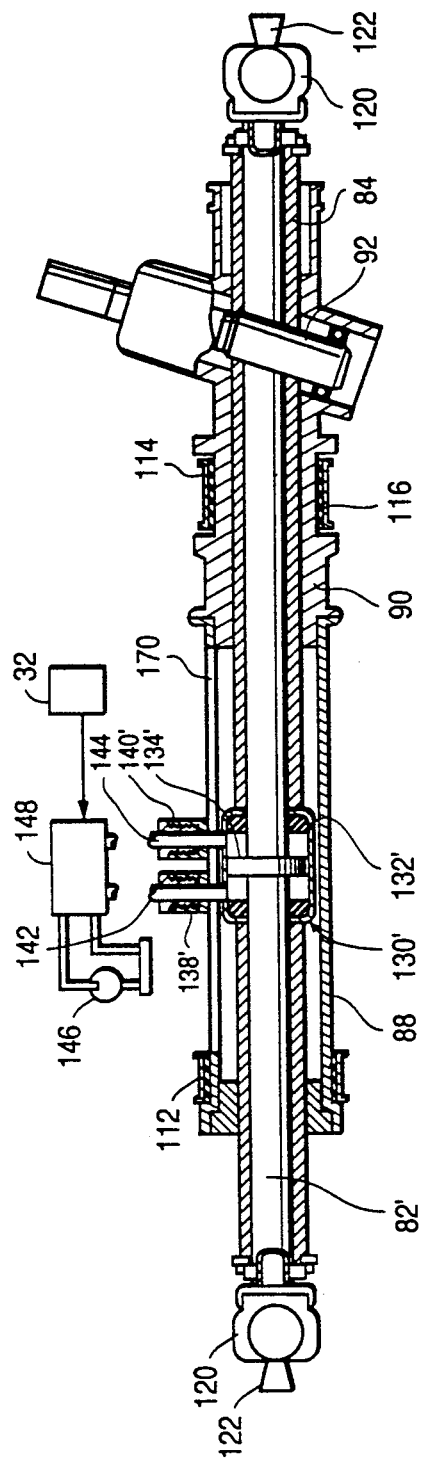
FIG. 9 is a longitudinal sectional view through another mechanism operating in accordance with the embodiment disclosed in connection with FIG. 6.
Figure 10:
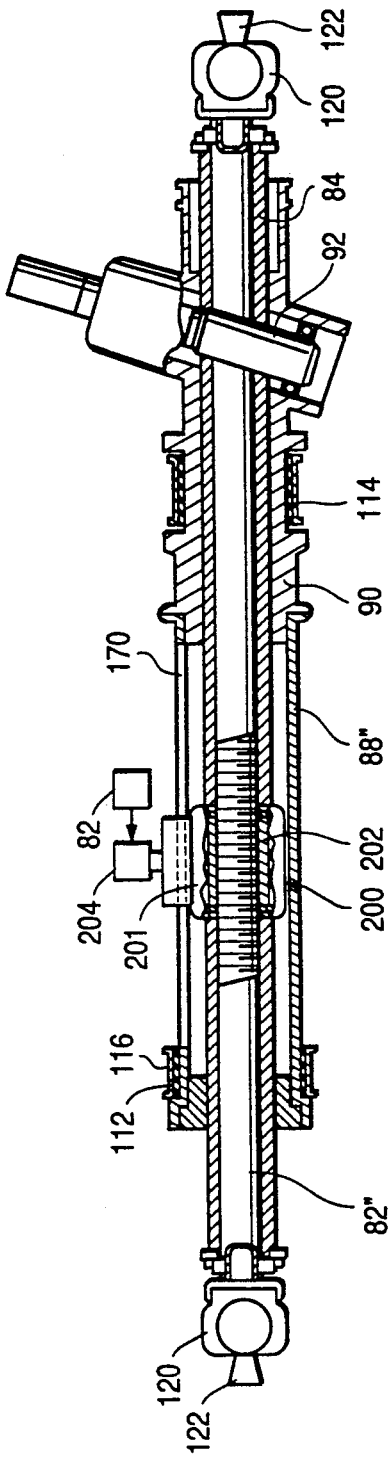
FIG. 10 is a longitudinal sectional view through a mechanism operating in accordance with the embodiment disclosed in connection with FIG. 1.

Depicted in FIGS. 8-10 are a number of preferred mechanisms which operate in accordance with the system disclosed in connection with FIGS. 6 and 7. FIGS. 8, 8A and 8B depict one of those mechanisms 80 in which a steering rod 82 is axially slidably mounted in a rack 84 in the form of a hollow cylinder. The rack includes teeth 86 formed on a portion of its outer circumference (see FIG. 8B). The rack 84 is eccentrically arranged relative to the tie or steering rod 82, with the teeth 86 formed on the thicker portion of the rack 84 to thus properly balance the device. The rack 84 is axially slidably mounted in a housing formed by axially aligned power steering housing 88 and steering gear housing 90.

Mounted in steering gear housing 90 is a conventional pinion 92 which - is mechanically coupled to the steering shaft. Pinion 92 meshes with the teeth of the rack (see FIG. 8B). Steering gear housing 90 includes power steering valve housing 94 from which a pair of fluid lines 96, 98 extend. Those lines are connected to fittings 100, 102 carried by power steering housing 88 to communicate with power steering chamber 104 on opposite sides of power steering piston 106 disposed in chamber 104. Connected to pinion 92 is a conventional power steering control valve 93 which controls the flow of power steering fluid from a pump (not shown) to a respective one of the lines 96, 98, depending upon the direction in which the steering wheel is turned.

The housing assembly 80 is mounted to a rigid frame 1 10 of the vehicle by means of a pair of elastic grommets 112, 114. Each grommet is in the form of a hollow cylinder through which a respective part of the housing extends. The grommet 112 receives the power steering housing 88, and the other grommet 114 receives the steering gear housing 90. Each grommet is bolted to the frame 110 by means of a bracket 116. Vibrations of the housing are dampened by the grommets.

Secured to opposite ends of steering rod 82 are ball joints 120 which are attached to the steerable wheels by steering arms 122. Axial displacement of the tie rod 82 in either direction produces a steering of the steerable wheels. The axial displacement of tie rod 82 can be produced by steering pinion 92 which effects an axial displacement of rack 84. Axial displacement of the rack 84 is transmitted to tie rod 82 by a mechanism which includes a fluid motor 130. Fluid motor 130 includes a control cylinder 132 connected to rack 84 and piston 134 integrally formed with rod 82. Piston 134 is axially slidable within chamber 136 formed by control cylinder 132 and oil seals 135. Communicating with chamber 136 on opposite sides of piston 134 are fittings 138, 140 which are coupled to flexible fluid lines 142, 144, respectively. Lines 142, 144 are arranged to receive pressurized fluid from a pump 146 after the fluid passes through valve 148, for example, a tri-positional solenoid valve. Valve 148 is actuated to divert pressurized fluid to one of, or neither of, lines 142 or 144 by controller 32 in the manner discussed earlier herein.

When neither of lines 142 or 144 is in communication with pump 146, fluid remaining in the chamber 136 on opposite sides of piston 134 is able to transmit axial force from control cylinder 132 to piston 134. Thus, axial movement of rack 84 produced by main steering mechanism 92, and by the power steering assembly is transmitted to tie rod 82 through control cylinder 132, the fluid in chamber 136, and piston 134. In other words, fluid in control cylinder 132 prevents tie rod 82 from moving relative to rack 84 when pump 146 is not linked to chamber 136.

In the event that controller 32 determines that the orientation of the steerable wheys should be adjusted in order to prevent excessive oversteer or understeer as discussed with respect to FIGS. 3-5, valve 148 is actuated to direct pressurized fluid from pump 146 to one side of piston 134. As a result, piston 134 is axially displaced relative to control cylinder 132, causing lateral movement of rod 82 with respect to rack 84 and steering the steerable wheels independently of the movement of rack 94.

In order to measure the amount of displacement of tie rod 82 relative to rack 84, which represents the amount by which the tie rod is displaced by controller 32, a potentiometer 150 is connected to the tie rod. Potentiometer 150 is of the linear type and includes a housing 152 mounted to control cylinder 132 for movement therewith, and a rod 154 connected to tie rod 82 by means of a bracket 156. Rod 154 is displaced relative to housing 152 in response to relative displacement between the tie rod and the rack, whereupon potentiometer 150 generates a signal which is fed back to the controller.

In order to measure the amount of displacement of rack 84, thereby providing an indication of the orientation of the steerable wheels, a rotary potentiometer 160 is coupled to pinion 92. A signal generated by the rotary potentiometer is fed back to controller 32.

A preferred mechanism depicted in FIG. 9 is similar to that depicted in FIG. 8, except that no power steering mechanism is provided, and control cylinder 132' of motor 130' is mounted intermediate the axial ends of rack 84. Fittings 138' and 140' are arranged for displacement within a slot 170 formed in the housing part 88'. Linear and rotary potentiometers are not depicted, but would be provided. The embodiment according to FIG. 9 operates in the same manner as that disclosed in connection with FIG. 8, the steering forces being transmitted through the rack 84 and the piston 134' en route to the steering arms.

A preferred mechanism depicted in FIG. 10 is similar to that depicted in FIG. 9, except that in lieu of a fluid motor 130', there is provided an electric motor 200. The electric motor 200 includes a housing 201 connected to the rack 84, and an output element in the form of an internally threaded rotary nut 202 which is rotated when an electric power source 204 energizes a stator of the motor 200 in response to a signal from the controller 32. The nut 202 meshes with external threading on the tie rod 821' in order to axially displace the tie rod relative to the rack 84. Although not depicted, potentiometers for measuring the displacement of the rack, and relative displacement between the tie rod and rack would be provided. Steering forces from the pinion 92 are transmitted through the rack 84 and the electric motor output nut 202 en route to the steering arms.

Figure 11:
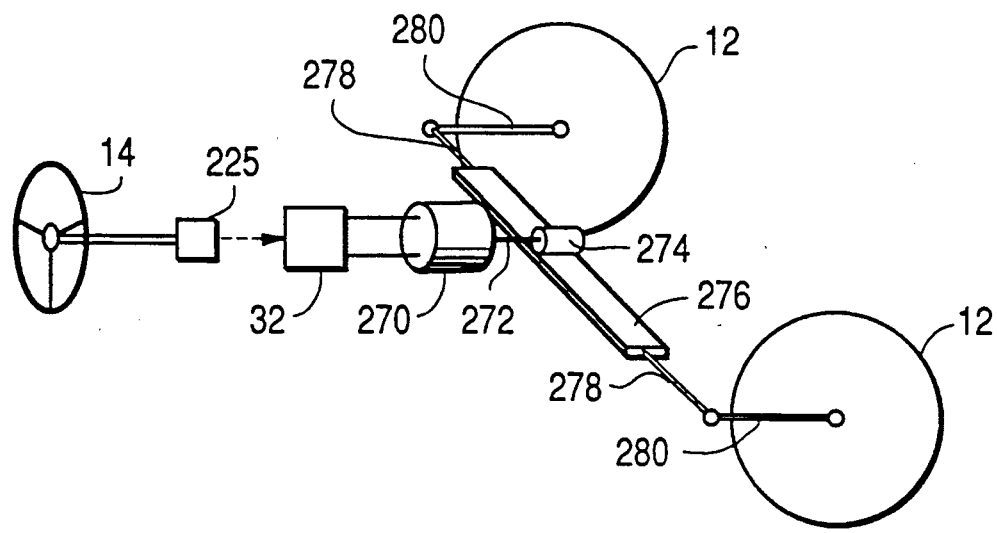
FIG. 11 is a schematic perspective view of a third embodiment of a steering mechanism according to the present invention.

FIG. 11 depicts a third preferred embodiment of the steering mechanism wherein there is no mechanical connection between the steering wheel 14 and the steerable wheels 12. Rather, the rack and pinion are controlled solely by electrical signals from the controller 32. The controller 32 is electrically connected to an electric motor 270, the output shaft 272 of which is connected to a pinion 274. The pinion meshes with the teeth of a rack 276, the ends of which are connected to tie rods 278. The tie rods 278 are connected to steering arms 280.

In operation, rotation of the steering wheel 14 results in a signal being generated by the steering wheel angle sensor 225. That signal is supplied to the controller in the same fashion as disclosed in connection with FIG. 3. Thus, whenever the steering wheel is turned, the controller will deliver a control signal to the motor 70 for turning the steerable wheels 12 by an amount which avoids an appreciable oversteer or understeer.

Figure 12:
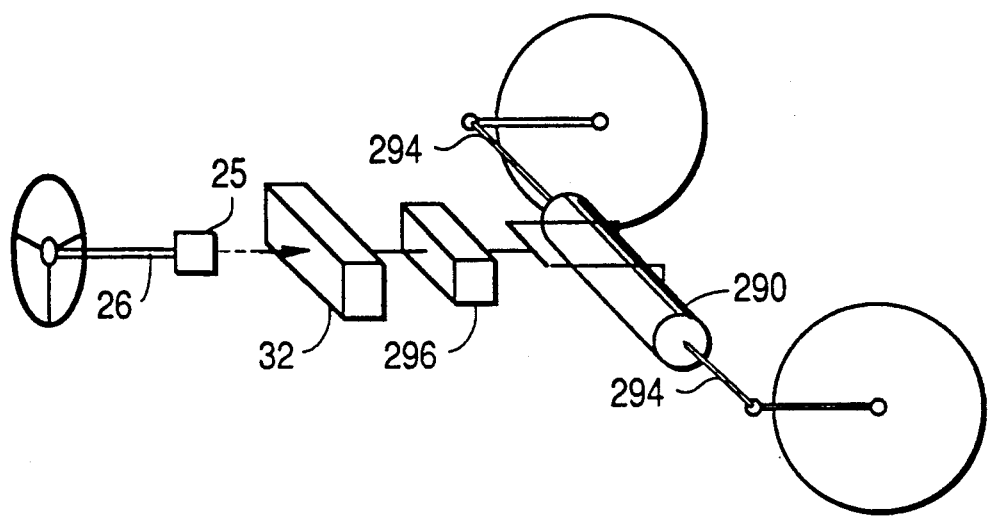
FIG. 12 is a schematic perspective view of a fourth embodiment of a steering mechanism in accordance with the present invention.
Figure 13:
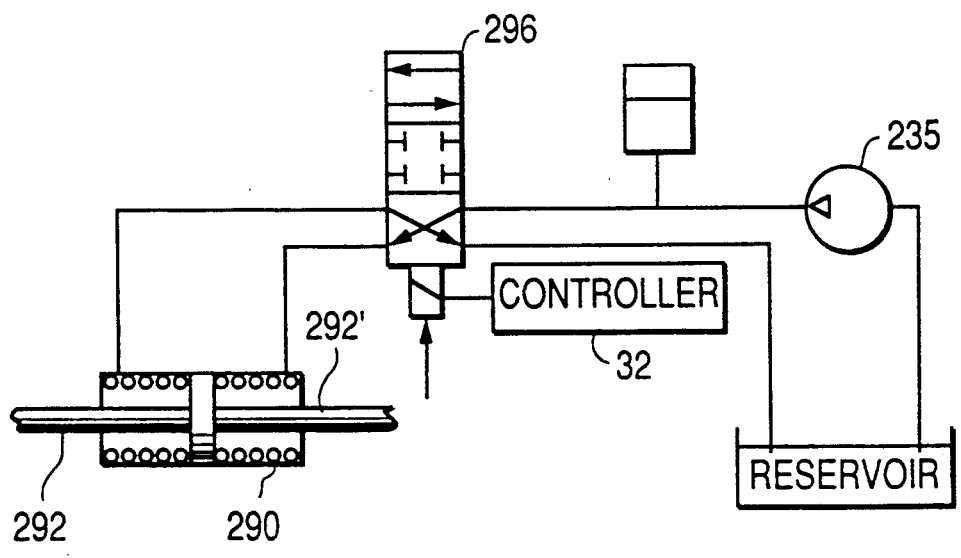
FIG. 13 is a schematic view of a portion of the steering mechanism of FIG. 11.

FIGS. 12 and 13 depict a fourth preferred embodiment of a steering mechanism which is a variant of that described above in connection with FIG. 11 in that the controller 32 controls a fluid mechanism similar to that described above in connection with FIGS. 6 and 7. That is, a fluid cylinder 290 has piston rods 292, 292' connected to tie rods 294. The output signal from the controller 32 is delivered to a three-way solenoid valve 296 to cause pressurized fluid to be conducted from a pump 295 to the fluid cylinder 290 to steer the steerable wheels 12.

FIGS. 14-18 show a schematic diagram of a fail-safe system which may be used with many of the previously disclosed embodiments to prevent operation of the stability augmentation system should a malfunction occur, thereby preventing loss of control of the vehicle. In particular, when an electrical or fluid malfunction occurs, the fail-safe system isolates the fluid chambers of the adaptive steering control system, preventing leakage of fluid, for example, oil, and ensuring that the vehicle may be controlled in a normal manner.

Figure 14:
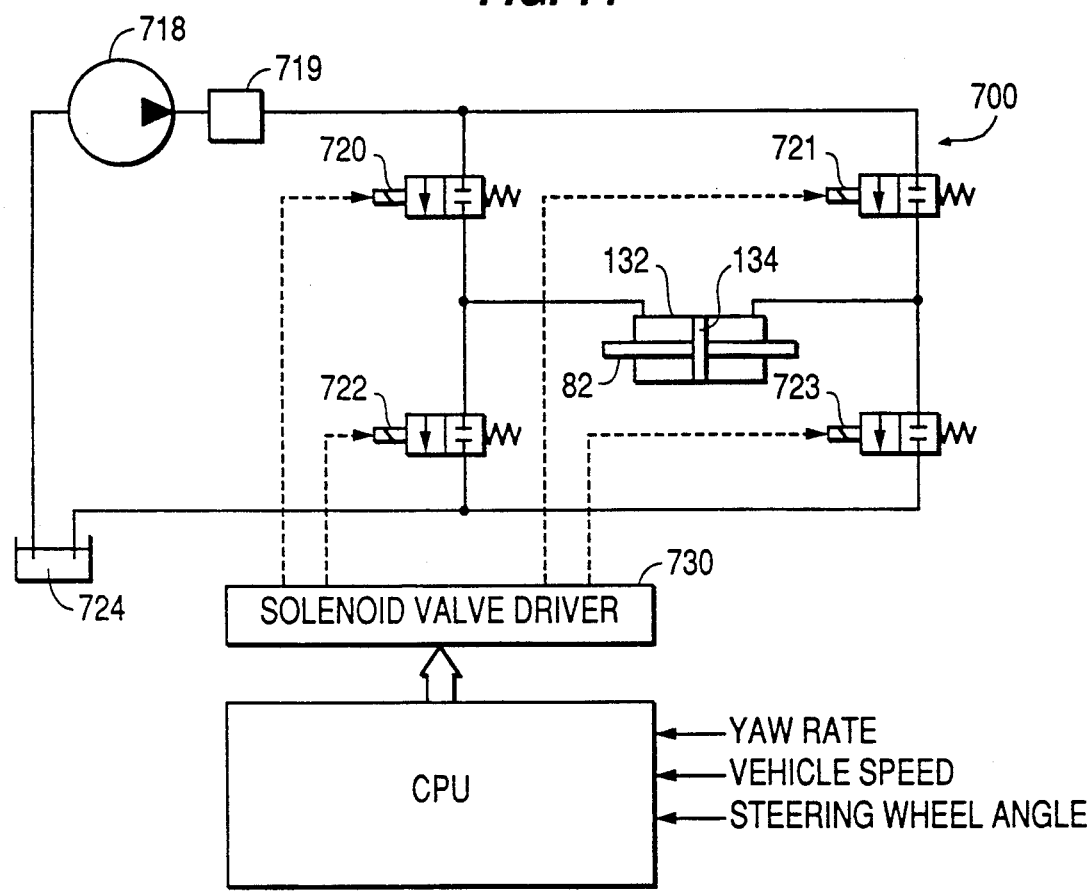
FIG. 14 is a schematic diagram of a fail-safe system of the present invention which may be used with any of the fluid controlled embodiments.

With reference to FIG. 14, a first embodiment of a fail-safe system according to the present invention is shown. Fail-safe device 700 includes four on/off solenoid valves 720, 721, 722 and 723, disposed in place of valve 148 as shown, for example, in FIG. 8. Solenoid valves 720 and 722 are positioned in series and are linked, at a point between the two valves, to the fluid chamber of control cylinder 132 disposed to the left side of piston 134. Solenoid valves 721 and 723 are also positioned in series and are linked, at a point between the valves, to the fluid chamber of control cylinder 132 disposed to the right side of piston 134. The series arrangement of valves 720 and 722 is disposed in parallel to the series arrangement of valves 721 and 723, between regulator 719 and fluid reservoir 724. All of the on/off valves 720-723 are bi-positional, open/close valves, and are biased so as to normally be in the closed position. For example, as shown in FIG. 14, the solenoid valves may be spring biased to the closed position, preventing flow of fluid therethrough. Valve controller 730, which may be an electrically driven solenoid valve driver, is linked to each of the solenoid valves, and controls the position of the valves in response to the CPU. In order to open valves 720-723, driver 730 must act to overcome the bias which causes the valves to be normally closed.

When the vehicle is steered, if no adaptive steering control is needed to correct an understeer or oversteer condition, all of the solenoid valves remain in the closed position as shown in FIG. 14, such that the pressure on either side of piston 134 is equal. However, when adaptive control is needed in order to correct an understeer or oversteer condition, piston 134 must be moved to the right or left, causing steering rod 82 to move laterally with respect to rack 84, and thereby providing the corrective steering control, as discussed above with reference to FIG. 8. This movement is provided by operation of the CPU, which actuates solenoid valve driver 730 to cause piston 134 to move in the desired direction.

For example, when the CPU determines that piston 134 must be moved to the right to provide the needed control, solenoid valve driver 730 is actuated to move valves 720 and 723 to the opened position, against the restoring force of the springs. Fluid flows from pump 718 through valve 720 and into the left chamber, increasing the pressure therein and moving piston 134 to the right. This movement causes fluid contained in the right chamber to flow through opened valve 723 and into reservoir 724. When it is desired to move piston 134 to the left, valves 720 and 723 are closed, and valves 721 and 722 are opened such that the fluid from pump 718 flows into the right chamber, and out of the left chamber and into reservoir 724. Of course, the opening and closing of all of the valves is continually controlled by the CPU to move rod 82 as necessary with respect to rack 84, until the desired yaw rate is obtained. All of the valves would be closed after corrective steering control is completed and the piston is returned to the center position.

The provision of the open/close valves, which are normally in the closed position, ensures that during an electrical failure which would interfere with normal operation of the CPU and valve driver, corrective steering control will either not be initiated, or if already initiated, that it will be terminated, and that normal steering will be possible. For example, if the vehicle is undergoing corrective steering control, two of the four solenoid valves will be in the opened position due to operation of solenoid valve driver 730. If there is a failure in the electrical circuit of the vehicle, for example, due to a broken belt or dead battery, the CPU will become inoperative and proper control of the solenoid valves will become impossible. Therefore, it will become impossible to provide effective corrective steering control. However, since operation of the electrically driven solenoid valve driver is also prevented, all of the open/close valves will be returned to their normally closed position due to the returning force provided by the springs. Thus, the fluid chambers within cylinder 132 will be isolated from the fluid pump and reservoir, and the position of the piston within the cylinder will be fixed. Even though piston 134 may be off-center with respect to cylinder 132, and rod 82 may not be centered with respect to rack 84, normal steering control is still possible with lateral movement of rack 84 transferred to rod 82 through the fluid pressure within the chambers. Accordingly, the potentially dangerous situation in which the fluid chambers remain linked to the pump and the reservoir, concurrently with loss of proper control of the link due to the inoperability of the CPU is avoided, as well as the corresponding potential for one chamber to be over-pressurized or completely drained of fluid. Additionally, the potential for the rod to move freely and uncontrollably with respect to the rack is also prevented. Thus, loss of control of the vehicle is avoided.

Figure 15:
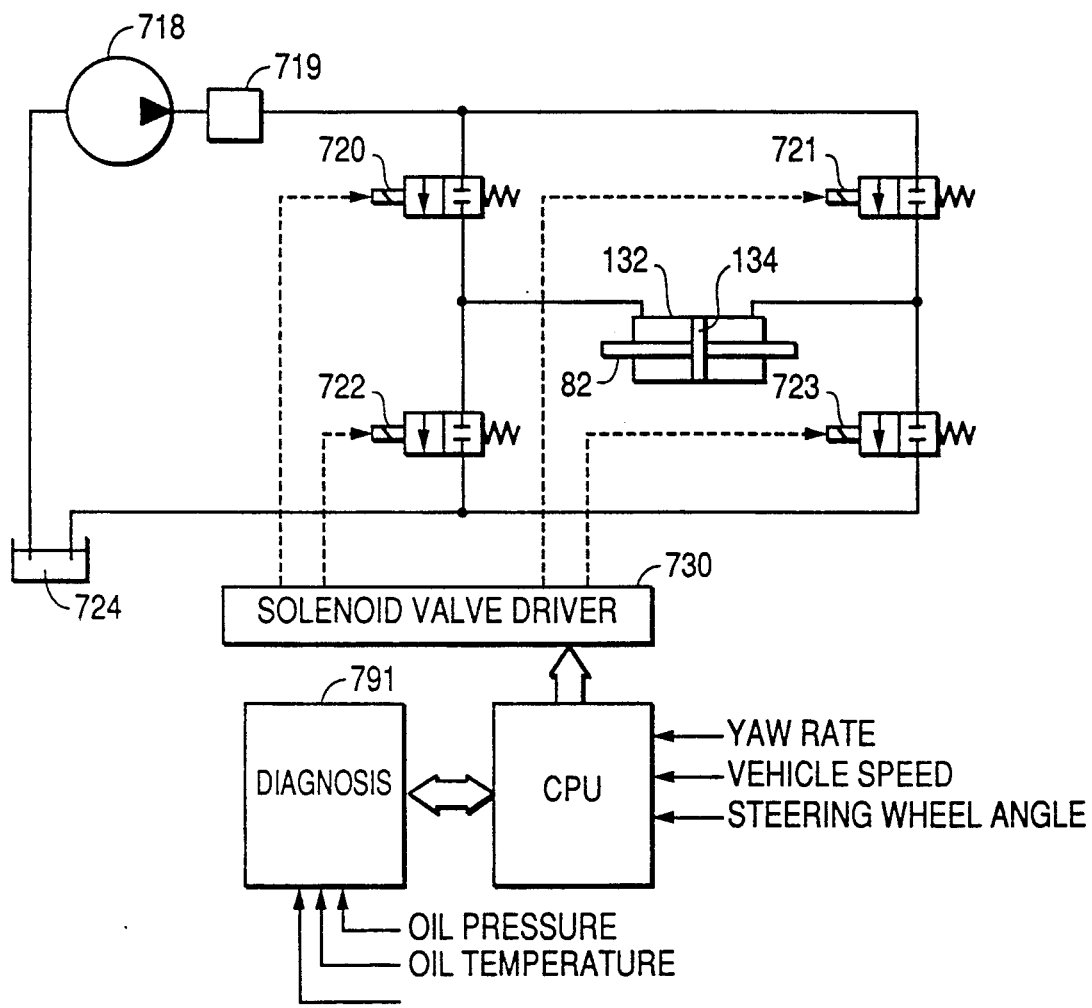
FIG. 15 is a schematic diagram similar to the diagram shown in FIG. 14, but including a diagnosis circuit.

The system shown in FIG. 15 is identical to the system shown in FIG. 14 except that diagnosis circuit 731 is also provided to check various operating conditions in the fluid circuit, for example, the fluid pressure, flow rate, or temperature of the fluid flowing to cylinder 132. If a malfunction such as a loss of pressure, an insufficient flow rate, or an undesirable increase in the temperature of the fluid in the fluid circuit is detected, the diagnosis circuit transmits a signal to the CPU, causing the CPU to deactivate the solenoid valve driver, thereby allowing all of the open/close valves to return to the closed position, or preventing them from opening if they are already closed. Thus, the interior chambers of cylinder 132 are isolated as discussed above to prevent any fluid from flowing out of the cylinder, and piston 134 is locked in position. Since a leak in the fluid circuit would prevent the fluid in the cylinder from being replaced, a loss of control due to the piston being freely movable in the cylinder is prevented. Furthermore, the signal from the diagnosis circuit prevents the CPU from responding to any further signals from the detectors until the problem in the fluid circuit is corrected. Of course, if the diagnosis circuit detects a malfunction in the fluid circuit when corrective control is not being provided, since the CPU will not be responsive to the signals from the detectors, corrective control will never be initiated. In either case, after the malfunction is detected, normal steering control will still be possible due to the fluid remaining in the fluid chambers, as discussed above.

Figure 19:
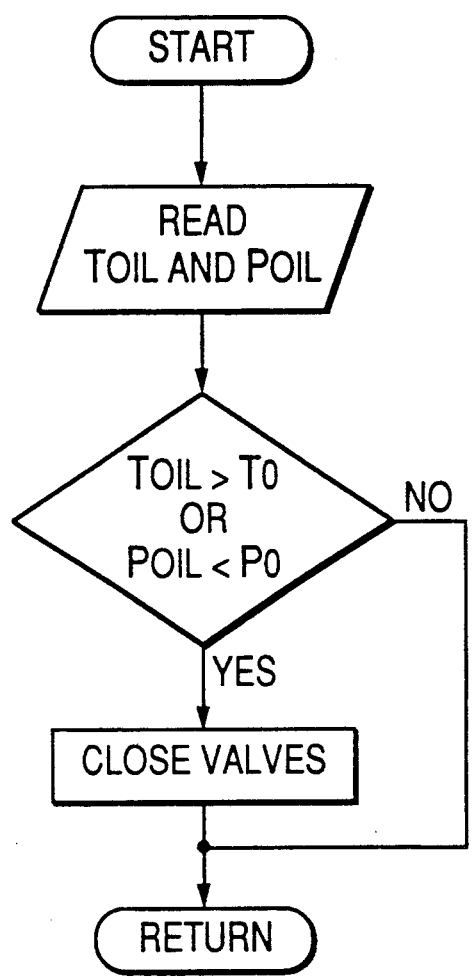
FIG. 19 is a flow chart showing the diagnosis circuit for the fail-safe system.

The operation of diagnosis circuit 731 may be understood with reference to to the flow chart shown in FIG. 19. The diagnosis circuit monitors the oil pressure, for example the oil pressure $P_{oil}$ at the outlet of regulator 719, and the oil temperature, for example, the oil temperature $T_{oil}$ in reservoir 724. $T_{oil}$ and $P_{oil}$ are compared with the threshold values of oil pressure $P_o$ and oil temperature $T_o$. If $T_{oil}$ exceeds $T_o$ or if $P_{oil}$ is less than $P_o$, than valves 700–723 are restored to or maintained in the closed position.

Additionally, as shown in all embodiments of the stability augmentation system which use fluid control, in a preferred embodiment the fluid or oil circuit is independent from all of the other fluid circuits of the vehicle. However, it is possible to combine the circuit with a further fluid circuit using a similar fluid, for example, the power steering oil circuit or the four wheel steering oil circuit. In these situations, sufficient control will be provided if the diagnosis circuit is only used to monitor the fluid circuit for the stability augmentation system, especially at the outlet of regulator 719. Of course, other parts of the vehicle fluid system may be monitored by the diagnosis circuit as well.

Figure 16:
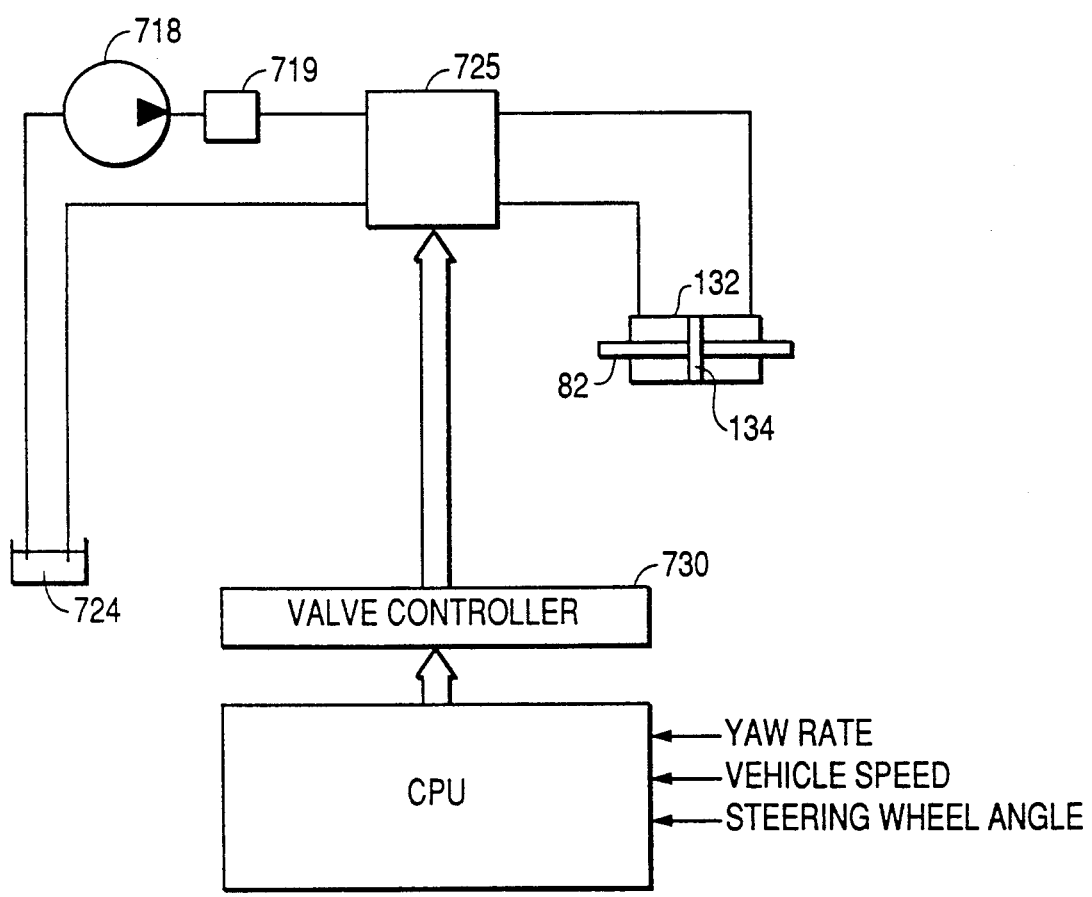
FIG. 16 is a schematic diagram showing a second embodiment of a fail-safe system.
Figure 17:
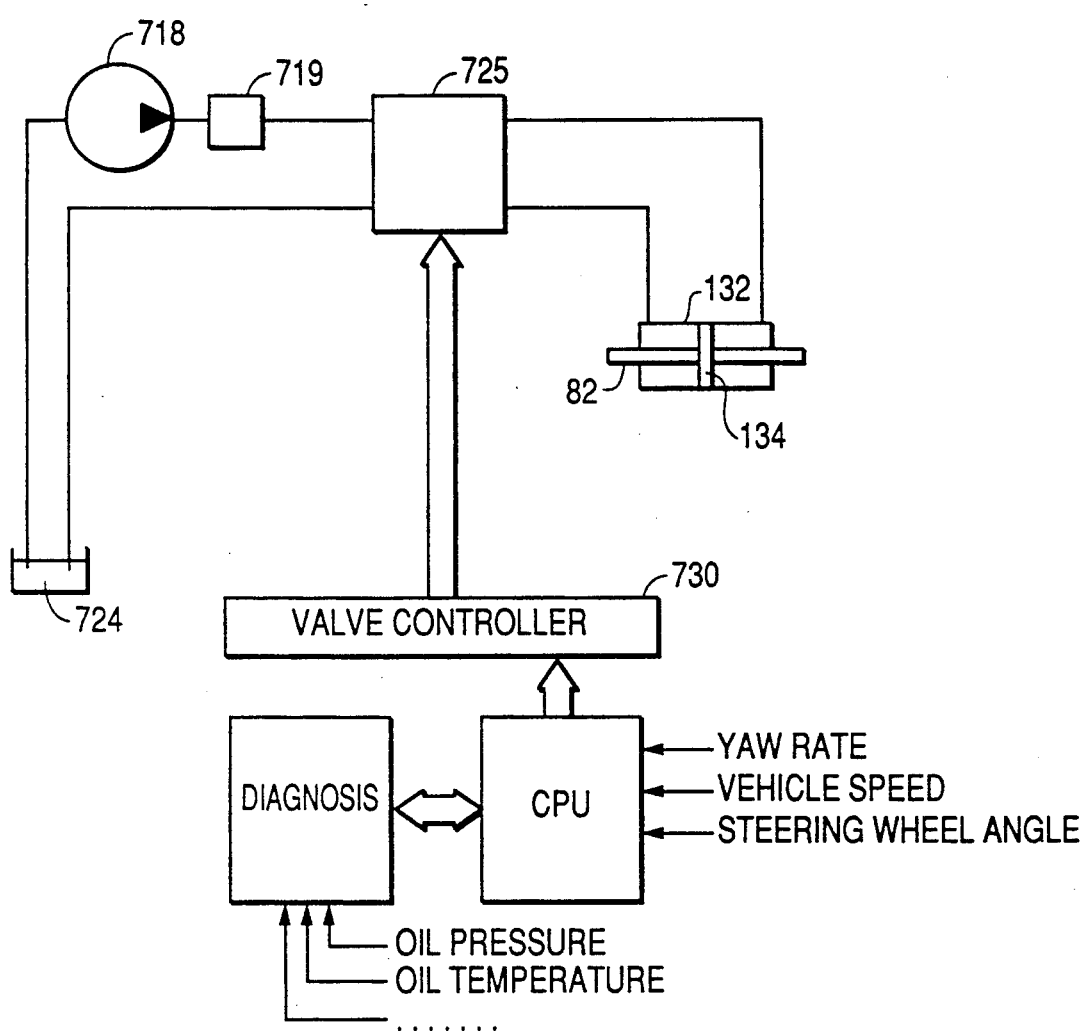
FIG. 17 is a schematic diagram similar to the diagram of FIG. 16, but including a diagnosis circuit.

As shown in FIG. 16, linear solenoid valve 725 is used in place of open/close solenoid valves 720, 721, 722 and 723. Valve 725 is known in the art and is interposed in the fluid circuit in a known manner between both pump 718 and reservoir 724, and fluid cylinder 132 for controlling the flow of fluid from the pump to the fluid chambers, and from the chambers to the reservoir. Linear solenoid valves include a spool which moves laterally between at least three positions to control the links of the various fluid lines leading into the valves with each other. The spool in a linear solenoid valve is normally biased in a position isolating the pump and the reservoir from the fluid chambers. If the spool has already moved to link the fluid lines, a loss of electrical power will automatically result in the spool being returned to a position in which the various fluid lines are isolated. Also, diagnosis circuit 731 can be used with the embodiment shown in FIG. 16, as shown in FIG. 17. In other respects, the adaptive control functions as discussed in the above embodiments.

Figure 18:
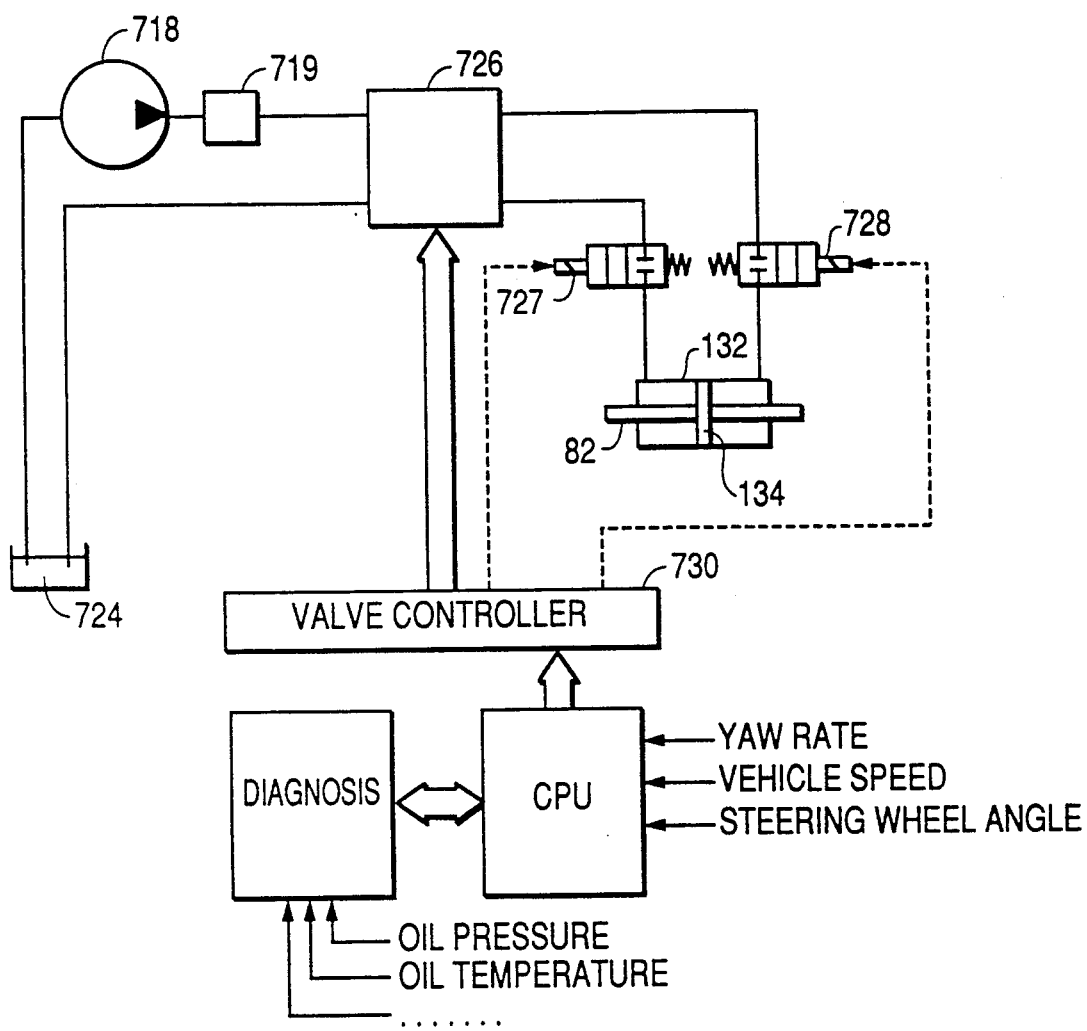
FIG. 18 is a schematic diagram showing a third embodiment of a fail-safe system.

The embodiment shown in FIG. 18 is similar to the embodiment shown in FIG. 17 except that linear solenoid valve 725 is replaced by servovalve 726, which is known in the art. The spool in a servovalve is not normally biased in either a closed or open position, but operates under the control of an electric motor to control the links of the fluid lines such that if the electrical power fails, movement of the spool is prevented. Accordingly, spring biased open/close valves 727 and 728 are included to ensure that fluid flow to or from cylinder 132 is prevented should the electrical power fail during adaptive control to terminate the link of both the reservoir and the fluid pump with cylinder 132. Valves 727 and 728 are disposed between valve 726 and are each linked to one of the chambers on either side of piston 134. As in the FIG. 14 embodiment, open/close valves 727 and 728 are all controlled by valve controller 730, and are biased into the closed position. Whenever corrective steering control is provided, valves 727 and 728 are moved to their opened position by valve controller 730, against the spring restoring force. Accordingly, normal corrective steering control is provided by controlling valve 726, as discussed above.

However, if an electrical power failure occurs, valve controller 730 becomes inoperative, and valves 727 and 728 either remain in or are returned to their normally closed position to isolate the fluid chambers, regardless of the operating state of valve 726. Thus, the provision of valves 727 and 728 does not interfere with the normal operation of valve 726 in performing the function of corrective control. Rather, valves 727 and 728 function as shut-off valves should an electrical failure occur. Additionally, if a malfunction is detected by diagnosis circuit 731, the CPU deactivates valve controller 730, and valves 727 and 728 remain in or are returned to their closed position to isolate the fluid chambers. Of course, normal steering control will still be possible as discussed above.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

I claim:

1. A vehicle steering apparatus for providing adaptive steering control and including a fail-safe mechanism, said apparatus comprising:

steering rod means mounted for lateral movement with respect to the vehicle, said steering rod means linked at both ends to steerable wheels of the vehicle, said steering rod means for steering the vehicle by undergoing lateral movement and causing pivoting motion of the steerable wheels;

steering means for steering the vehicle by causing lateral movement of said steering rod means relative to the vehicle, said steering means including a steering wheel connected to said steering rod means;

means for providing adaptive steering control to the vehicle by causing said steering rod means to undergo lateral movement relative to the vehicle in addition to the lateral movement provided by the steering means, said means for providing adaptive steering control detecting an actual steering condition of the vehicle and comparing it with a desired steering condition of the vehicle, said additional lateral movement provided in accordance with the comparison of the actual and desired steering conditions so as to cause them to be equal, said means for providing adaptive steering control including a fluid pressure responsive means for providing the additional lateral movement to said steering rod means, fluid pressure source means for providing fluid pressure to said fluid pressure responsive means, and fail-safe valve means for controlling the flow of fluid between said fluid pressure source means and said fluid pressure responsive means, said fail-safe vale means biased so as to prevent the flow of fluid to the fluid pressure responsive means from the fluid pressure source means; and a diagnosis circuit means for measuring the pressure and temperature of the fluid flowing between said fluid pressure responsive means and said fluid pressure source means, said diagnosis circuit means storing a threshold fluid temperature and fluid pressure, said diagnosis circuit means comparing the measured fluid temperature and fluid pressure with the stored temperature and pressure, respectively, said diagnosis circuit means causing said fail-safe valve means to prevent the flow of fluid if the measured temperature exceeds the threshold temperature or if the measured pressure is less than the threshold pressure.

2. The apparatus recited in claim 1, said means for providing adaptive steering control further including a controller means for controlling said fail-safe valve means by selectively opening said fail-safe valve means to allow fluid flow between said fluid pressure source means and said fluid pressure response means as desired to provide the adaptive steering control.

3. The apparatus recited in claim 1, said steering rod means including a piston, said fluid pressure responsive means comprising a housing, said piston disposed within said housing and separating the interior of said housing into first and second fluid chambers.

4. The apparatus recited in claim 3, said fail-safe valve means comprising four open/close valves which are biased into a closed position, said fluid pressure source means comprising a fluid circuit including a pump and a reservoir, said housing linked in said fluid circuit between said pump and said reservoir, a first pair of said open/close valves linked in series between said pump and said reservoir, each open/close valve of said first pair of open/close valves linked to one of said fluid chambers at a location between each of said first pair of open/close valves, a second pair of said open/close valves linked in series between said pump and said reservoir, each open/close valve of said second pair of open/close valves linked to the other of said fluid chambers at a location between each of said second pair of open/close valves, said second pair of open/close valves disposed in parallel with said first pair of open/close valves.

5. The apparatus recited in claim 4, said means for providing adaptive steering control further comprising a central processing unit and an electrically driven valve driver, said central processing unit detecting the actual steering condition of the vehicle and comparing it with the desired steering condition of the vehicle, said central processing unit activating said valve driver to cause at least one of said open/close valves to be opened and thereby selectively linking said chambers to said fluid pressure source means to thereby adjust the fluid pressure in said chambers as desired, the difference in pressure in said chambers causing said piston to move laterally and thereby causing said steering rod means to undergo the additional lateral movement, said valve drive becoming inoperative if the vehicle experiences an electrical failure and thereby allowing the open/close valves to prevent the flow of fluid to the fluid pressure responsive means from the fluid pressure source means.

6. The apparatus recited in claim 5, said diagnosis circuit means emitting a signal to said central processing unit to cause said central processing unit to deactivate said valve driver if the measured temperature exceeds the threshold temperature or if the measured pressure is less than the threshold pressure.

7. The apparatus recited in claim 5, the actual steering condition being the actual yaw rate of the vehicle and the desired steering condition being the desired yaw rate of the vehicle.

8. The apparatus recited in claim 3, said fluid pressure source means comprising a fluid circuit including a pump and a reservoir, said housing linked in said fluid circuit between said pump and said reservoir, said fail-safe valve means further comprising a tri-positional valve disposed between said fluid pressure source means and said housing.

9. The apparatus recited in claim 8, said tri-positional valve comprising a linear solenoid valve having a first position in which one of said fluid chambers is linked to said pump and the other of said fluid chambers is linked to said reservoir, a second position in which said other of said fluid chambers is linked to said pump and said one of said fluid chambers is linked to said reservoir, and a third position in which both said chambers are isolated from said pump and said reservoir, said linear solenoid valve biased to be in said third position.

10. The apparatus recited in claim 9, said means for providing adaptive steering control further comprising a central processing unit and an electrically driven valve driver, said central processing unit detecting the actual steering condition of the vehicle and comparing it with the desired steering condition of the vehicle, said central processing unit activating said valve driver to cause said linear solenoid valve to be in one of said three positions and thereby selectively linking said chambers to said fluid pressure source means to thereby adjust the fluid pressure in said chambers as desired, the difference in pressure in said chambers causing said piston to move laterally and thereby causing said steering rod means to undergo the additional lateral movement, said valve driver becoming inoperative if the vehicle experiences an electrical failure and thereby allowing the linear solenoid valve to prevent fluid flow to both said chambers from said fluid pressure source means.

11. The apparatus recited in claim 10, said diagnosis circuit means emitting a signal to said central processing unit to cause said central processing unit to deactivate said valve driver if the measured temperature exceeds the threshold temperature or if the measured pressure is less than the threshold pressure.

12. The apparatus recited in claim 10, the actual steering condition being the actual yaw rate of the vehicle and the desired steering condition being the desired yaw rate of the vehicle.

13. The apparatus recited in claim 1, said steering rod means including a piston, said fluid pressure responsive means comprising a housing, said piston disposed within said housing and separating the interior of said housing into first and second fluid chambers, said fluid pressure source means comprising a fluid circuit including a pump, a reservoir and a fluid control valve disposed between said pump and reservoir and housing and controlling the flow of pressurized fluid into and out of said chambers, said fail-safe valve means further comprising a pair of open/close valves, one said open/close valve disposed between said fluid control valve and one said chamber, the other said open/close valve disposed between the other said chamber and said fluid control valve, each said open/close valve biased to be in the closed position to isolate said chambers from said fluid circuit.

14. The apparatus recited in claim 13, said fluid control valve operable to either link one of said fluid chambers to said pump and the other of said fluid chambers to said reservoir, link the other of said fluid chambers to said pump and said one of said fluid chambers to said pump and said one of said fluid chambers to said reservoir, or isolate both said chambers from said pump and said reservoir, said means for providing adaptive steering control further comprising a central processing unit and an electrically driven valve driver, said central processing unit detecting the actual steering condition of the vehicle and comparing it with the desired steering condition of the vehicle, said central processing unit activating said valve driver to cause said fluid control valve to selectively link said chambers to said fluid pressure source means to thereby adjust the fluid pressure in said chambers as desired, the difference in pressure in said chambers causing said piston to move laterally and thereby causing said steering rod means to undergo the additional lateral movement, said valve driver also causing said open/close valves to be in the open position whenever adaptive steering control is to be applied, said valve driver becoming inoperative if the vehicle experiences an electrical failure and thereby allowing said open/close valves to prevent fluid flow to both said chambers.

15. The apparatus recited in claim 14, said diagnosis circuit means emitting a signal to said central processing unit to cause said central processing unit to deactivate said valve driver if the measured temperature exceeds the threshold temperature of if the measured pressure is less than the threshold pressure.

16. The apparatus recited in claim 14, the actual steering condition being the actual yaw rate of the vehicle and the desired steering condition being the desired yaw rate of the vehicle.

17. A steering control apparatus for a vehicle comprising:
  a rack mounted for lateral movement with respect to the vehicle, said rack including a housing;
  a steering input means including a steering wheel linked to said rack for providing lateral movement or said rack;
  a steering rod mounted for lateral movement with and with respect to said rack, said rod including a piston disposed thereon and within said housing, said piston dividing said housing into first and second fluid chambers, said steering rod linked at both ends to steerable wheels of the vehicle;
  fluid pressure source means for providing fluid pressure to said chambers, lateral movement of said rack thereby transferred to said rod through the fluid pressure in said chambers;
  fail-safe valve means for linking said fluid pressure source means and said housing in fluid communication, said fail safe valve means biased so as to be closed and thereby prevent fluid flow to said housing from said fluid pressure source means;
  control means for detecting an actual steering condition of the vehicle and for determining a desired steering condition, said control means comparing the actual steering condition and the desired steering condition and activating said fail-safe valve means to control the link between said fluid chambers and said fluid pressure source means to pressurize one chamber with respect to the other chamber and thereby cause said piston to move within said housing and further causing said steering rod to move relative to said rack to provide additional steering to the steerable wheels on the basis of the comparison; and
  a diagnosis circuit means for measuring the pressure and temperature of the fluid flowing between said housing and said fluid pressure source means, said diagnosis circuit means storing a threshold fluid temperature and fluid pressure, said diagnosis circuit means comparing the measured fluid temperature and fluid pressure with the stored temperature and pressure, respectively, said diagnosis circuit means causing said fail-safe valve means to prevent the flow of fluid if the measured temperature exceeds the threshold temperature or if the measured pressure is less than the threshold pressure.

18. The apparatus recited in claim 17, said rod disposed within said rack, said piston disposed at an end portion of said steering rod which extends beyond one end of said rack, said housing disposed at said one end of said rack.

19. The apparatus recited in claim 17, said rack including a rack extension, said housing comprising a cylinder disposed on said rack extension, said steering rod disposed through said cylinder.

20. The apparatus recited in claim 17, said rod disposed within said rack, said piston disposed on said rod at an intermediate position, said housing disposed intermediately on the ends of said rack.

21. The apparatus recited in claim 17, said control means further including an electrically driven valve means for controlling said fail-safe valve means, said valve driver means becoming inoperative if the vehicle experiences an electrical failure and thereby allowing said fail-safe means to prevent fluid flow to said housing.

22. The apparatus recited in claim 21, said diagnosis circuit means emitting a signal to said control means to deactivate said valve driver means if the measured temperature exceeds the threshold temperature or if the measured pressure is less than the threshold pressure.

23. The apparatus recited in claim 17, the actual steering condition being the actual yaw rate of the vehicle and the desired steering condition being the desired yaw rate of the vehicle.

24. The steering apparatus recited in claim 17, said fail-safe valve means comprising a servovalve and a pair of open/close valves, said pair of open/close valves serially disposed with said servovalve between said housing and said fluid pressure source means, said open/close valves biased to the closed position, said control means further comprising electrically driven valve activating means for activating said servovalve to control the link between said fluid chambers and said fluid pressure source means, said valve activating means causing said open/close valves to be in the open position when the additional steering is applied.

25. An apparatus for steering a motor vehicle, the vehicle comprising steerable wheels and steering arms connected to said steerable wheels, said apparatus comprising:
  a movable rack;
  main steering means including a steering wheel connected to said movable rack for moving said movable rack;
  fluid motor means operably interconnecting said movable rack and the steering arms, said motor means for transmitting steering forces from said movable rack to the steerable wheels through the steering arms, said motor means comprising relatively movable first and second parts, said first part connected to said movable rack and said second part connected to said steering arm;
  control means for measuring an actual vehicle steering condition, for determining a desired vehicle steering condition, and for generating an output signal in response to a comparison of the desired and actual vehicle steering conditions, said controls means operably connected to said motor means whereby said motor means is actuated in response to the output signal to steer the steerable wheels independently of movement of said rack;
  fail-safe valve means for controlling the flow of fluid to and from said fluid motor means, the opening and closing of said fail-safe valve means controlled by said control means, said fail-safe valve means normally biased into a closed position to isolate said fluid motor means from the flow of fluid; and a diagnosis circuit means for measuring the pressure and temperature of the fluid flowing to and from said motor means, said diagnosis circuit means storing a threshold fluid temperature and fluid pressure, said diagnosis circuit means comparing the measured fluid temperature and fluid pressure with the stored temperature and pressure, respectively, said diagnosis circuit means causing said fail-safe valve means to prevent the flow of fluid if the measured temperature exceeds the threshold temperature or if the measured pressure is less than the threshold pressure.

26. The apparatus recited in claim 25, said first part comprising a cylinder and said second part comprising a steering rod having a piston disposed thereon and within said cylinder.

27. The apparatus recited in claim 25, the actual steering condition being the actual yaw rate of the vehicle and the desired steering condition being the desired yaw rate of the vehicle.

* * * * *